June 21, 1949.

B. A. KEARNS ET AL
ROTARY PUMP AND MOTOR HYDRAULIC
TRANSMISSION SYSTEM 2,473,711

Filed Dec. 3, 1941

INVENTOR.
BERNARD A. KEARNS
JACOB DECKER
BY
H. K. Parsons
ATTORNEY.

June 21, 1949.                B. A. KEARNS ET AL                2,473,711
                        ROTARY PUMP AND MOTOR HYDRAULIC
Filed Dec. 3, 1941              TRANSMISSION SYSTEM                9 Sheets-Sheet 2

Fig. 3

INVENTOR.
BERNARD A. KEARNS
JACOB DECKER
BY
A. H. Parsons
ATTORNEY.

INVENTOR.
BERNARD A. KEARNS
JACOB DECKER
BY
ATTORNEY.

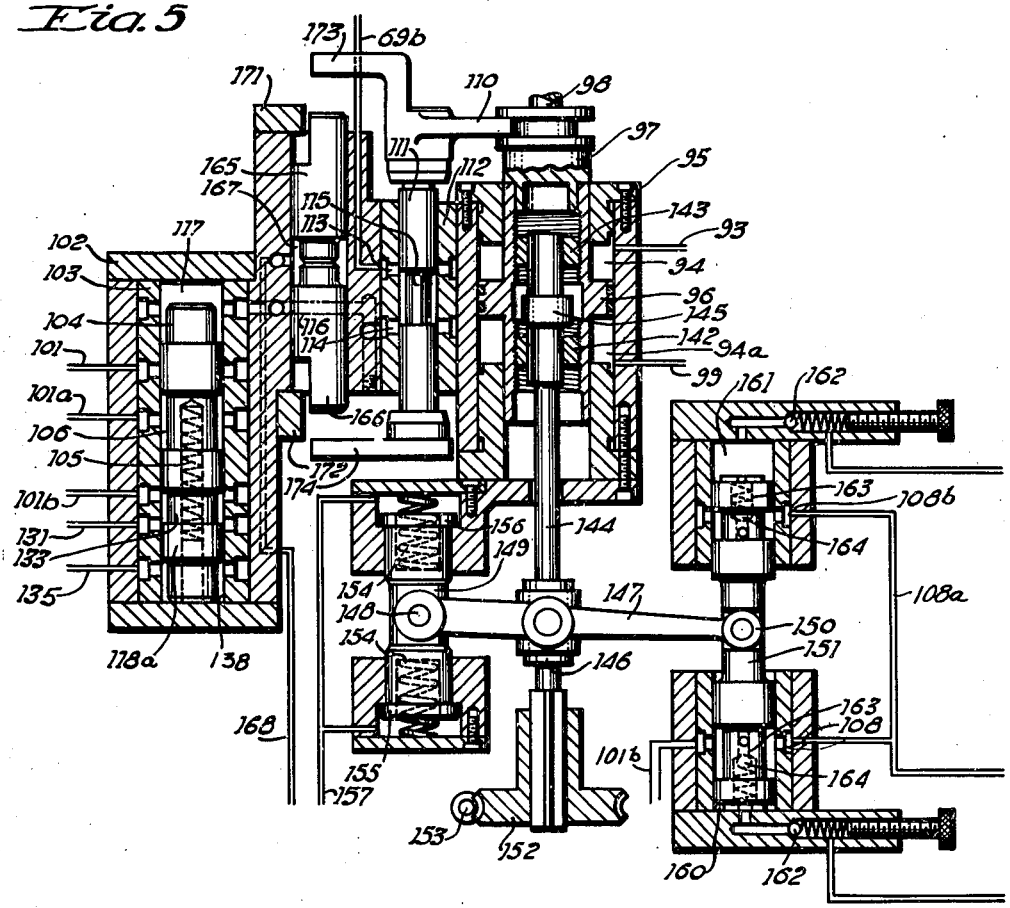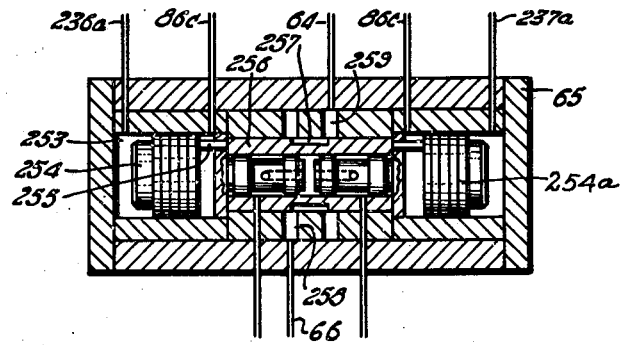

June 21, 1949.

B. A. KEARNS ET AL
ROTARY PUMP AND MOTOR HYDRAULIC
TRANSMISSION SYSTEM 2,473,711

Filed Dec. 3, 1941

INVENTOR.
BERNARD A. KEARNS
JACOB DECKER

BY

AH Parsons
Attorney

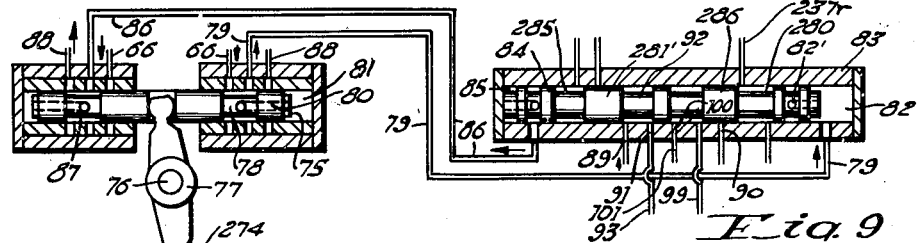

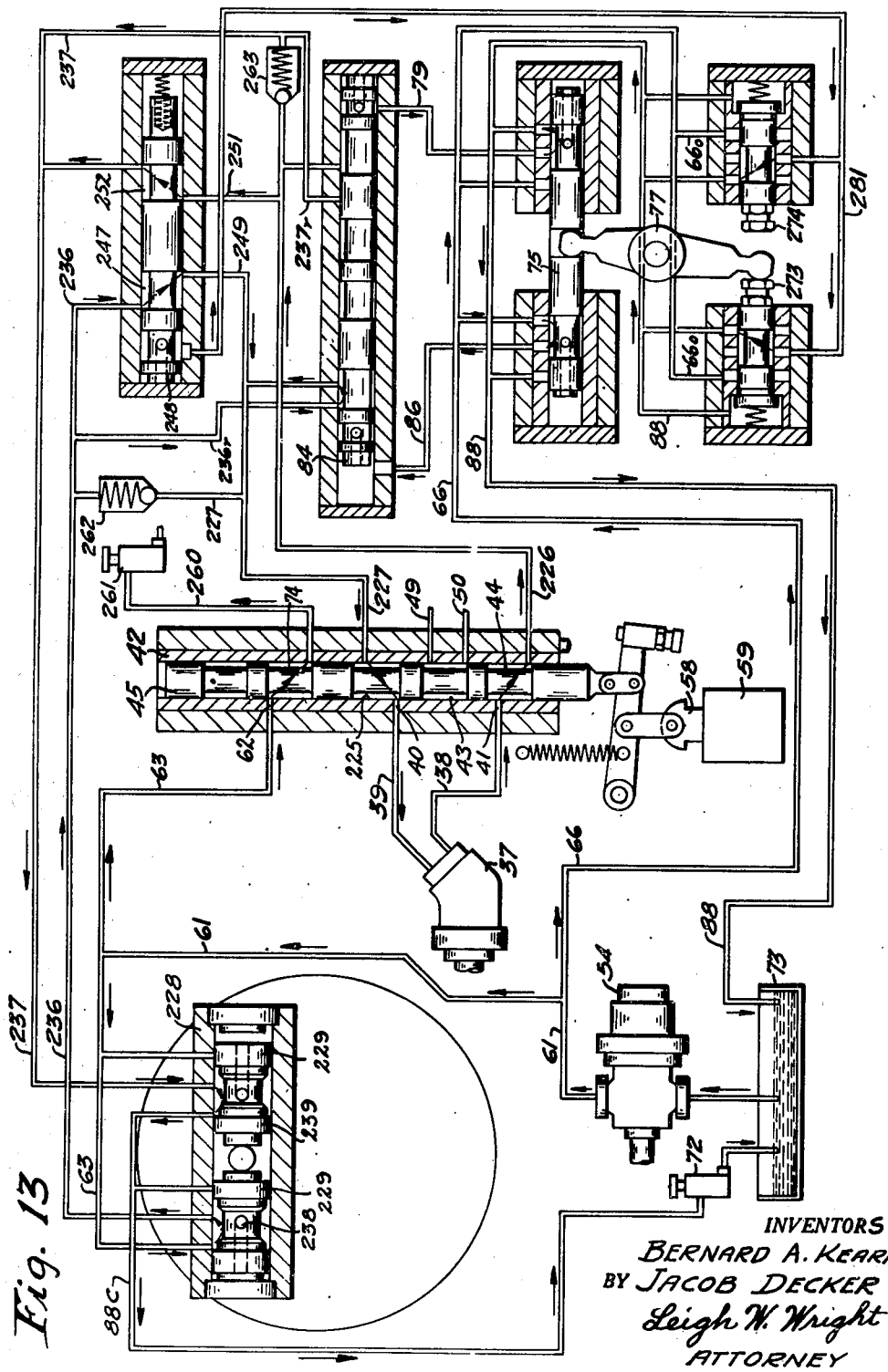

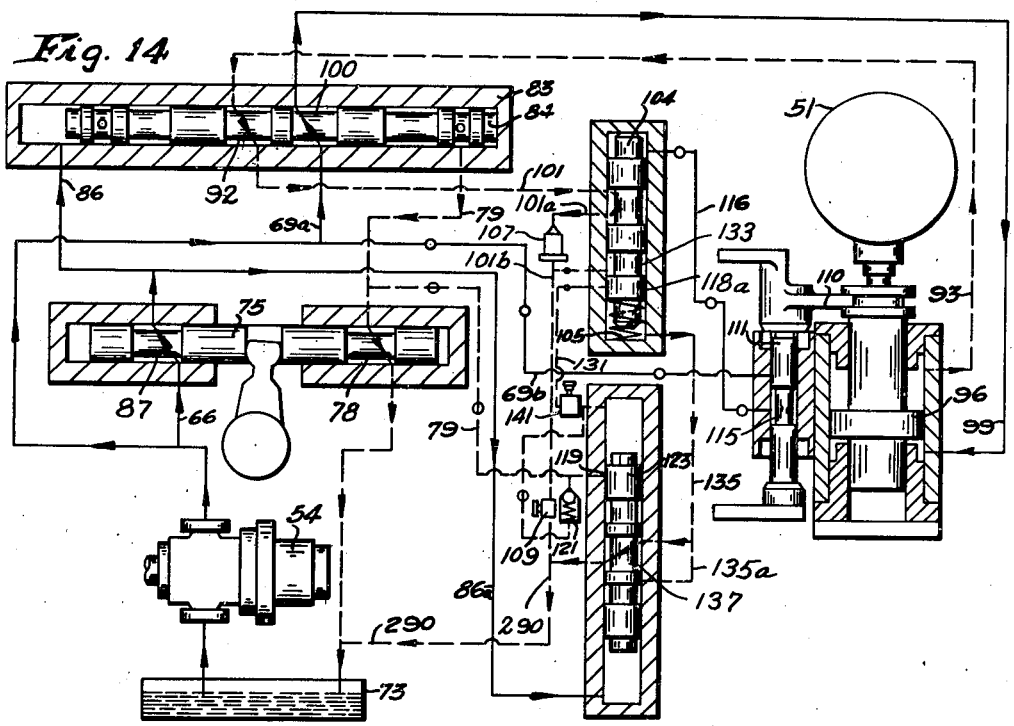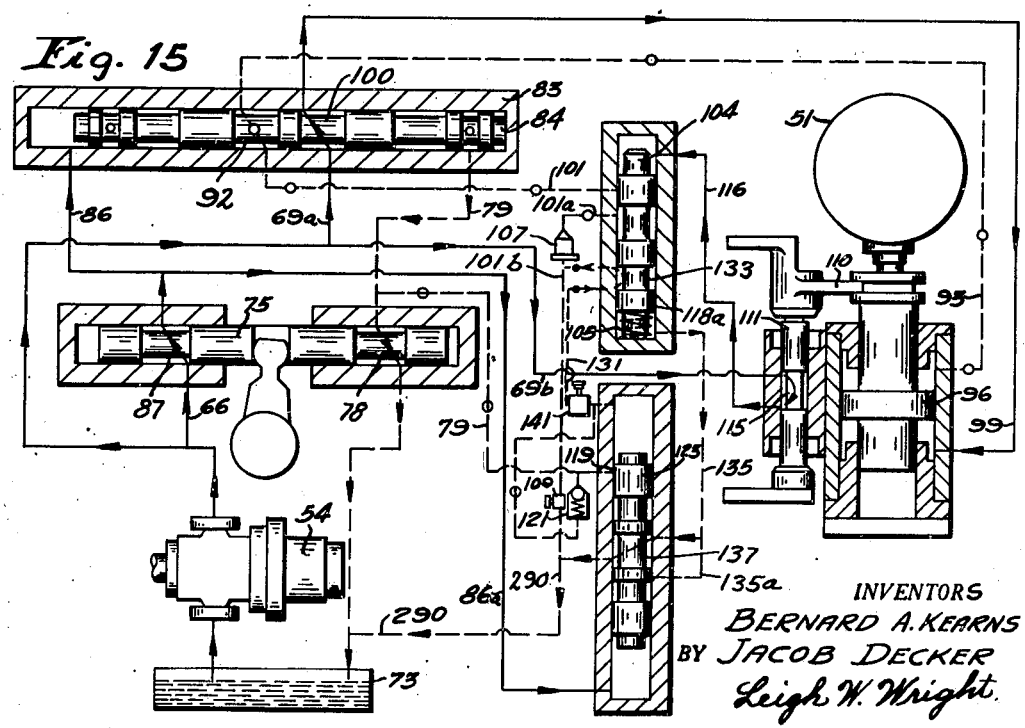

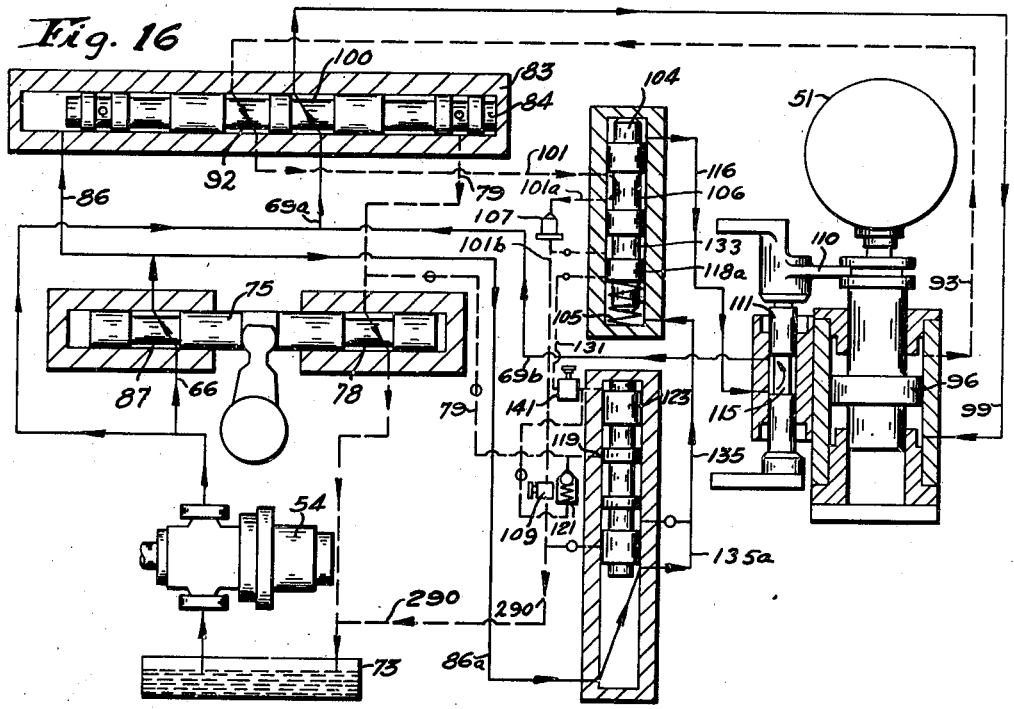
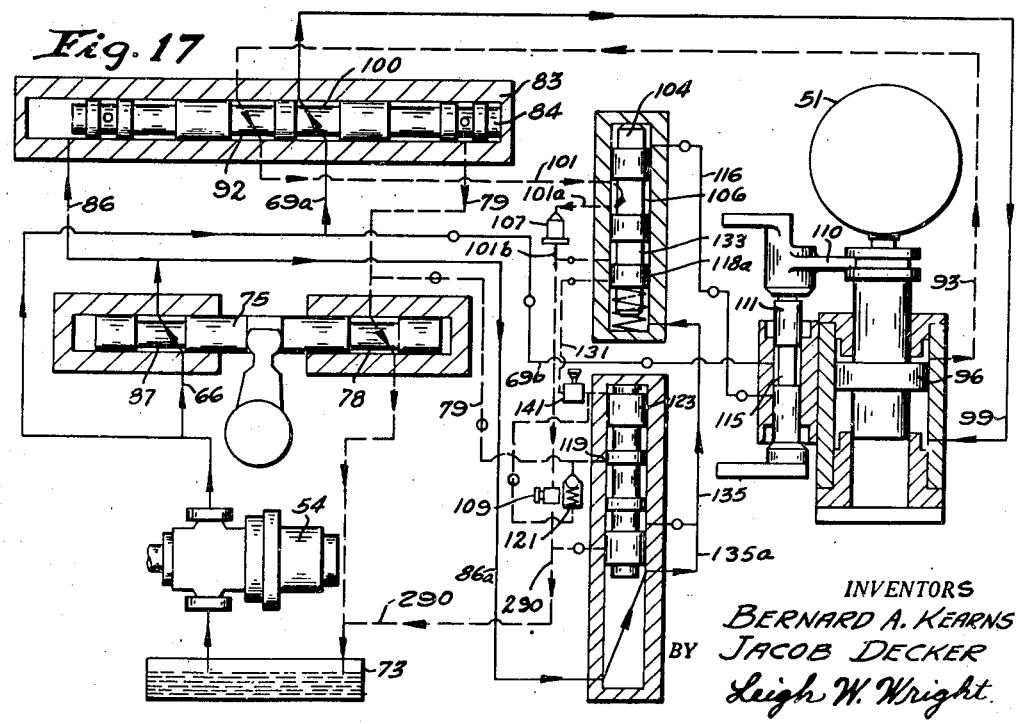

Patented June 21, 1949

2,473,711

UNITED STATES PATENT OFFICE 2,473,711

ROTARY PUMP AND MOTOR HYDRAULIC TRANSMISSION SYSTEM

Bernard A. Kearns and Jacob Decker, Cincinnati, Ohio, assignors to Cincinnati Grinders Incorporated, Cincinnati, Ohio, a corporation of Ohio Application December 3, 1941, Serial No. 421,464

32 Claims. (Cl. 60—53)

This invention relates to improvements in grinding machines and has particular reference to actuating mechanisms therefor.

One of the objects of the present invention is the provision of improved hydraulically actuable mechanisms for effecting alternatively the automatic or manual translation of the shiftable element whether head or table of a grinding machine or other machine tool.

A further object of the invention is the provision of improved mechanism effective positively to render the manual or automatic mechanisms alternately effective while preventing simultaneous operative connection of both of said mechanisms with the translatable element.

A further object of the present invention is the provision of a safety mechanism for limiting overrun of the translatable element beyond prescribed limits irrespective of whether the automatic or manually controlled traversing mechanism is being employed.

A further object of the invention is the provision of an improved hydraulic actuating circuit for the translatable member of a machine tool including a reversing device for determination of opposite directional movements and independent tarry control devices separately adjustable and arranged independently to act upon the reversing mechanism during different directional movements thereof, separately to determine the delay, tarry or dwell between initial shifting of a reversing element and the reversal of movement of the translatable element of the machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a diagrammatic view of a portion of the hydraulic control system for the machine of Figure 1.

Figure 5 is an enlarged view of a portion of the hydraulic control system shown in Figure 4.

Figure 6 is an enlarged view of the pressure control valve.

Figure 9 is a diagrammatic view showing the connections between the pilot valve and the reversing valve for one position of the pilot valve.

Figure 10 is an enlarged view of a portion of the hydraulic control system similar to Figure 5 with the valve parts in a different position.

Figure 11 illustrates the intermediate position of the tarry valve.

Figure 12 illustrates the final position of the tarry valve when the pilot is in the position shown in Figure 9.

Figure 13 is a diagrammatic view of the alternatively available servo-control circuit, and Figures 14, 15, 16, and 17 diagrammatically illustrate the sequential movement of the parts for a selected direction of movement of the pilot valve.

Figure 1:
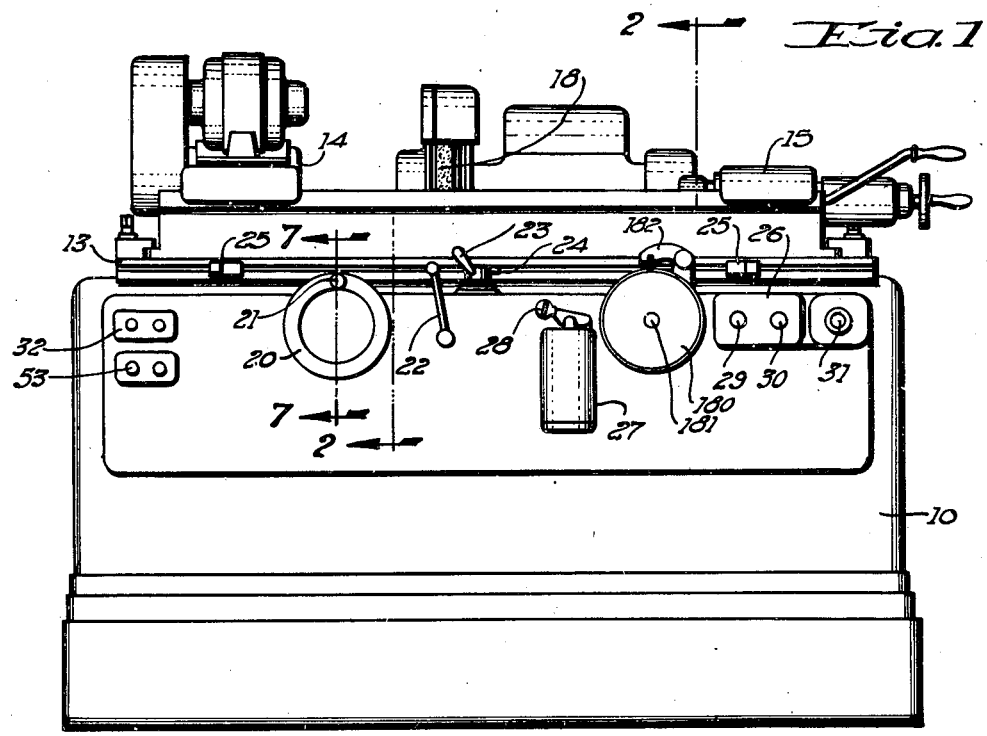
Figure 1 is a front elevation of a grinding machine embodying the invention aforesaid.
Figure 2:
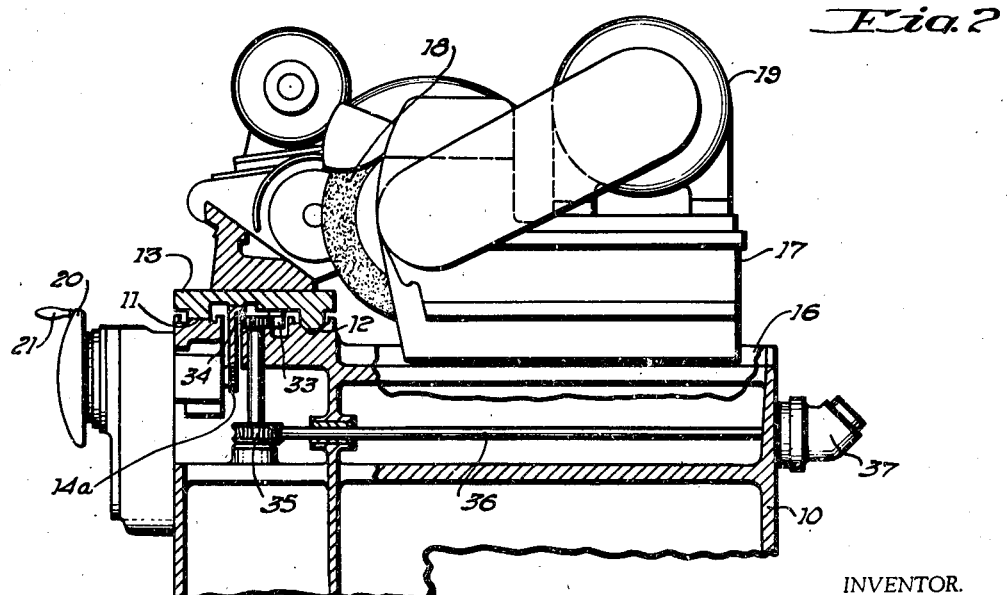
Figure 2 is a view partially in section and partially in elevation as on the line 2—2 of Figure 1.

In the drawings the numeral 10 designates the bed of a conventional type of grinding machine provided with the ways 11 and 12 on which is mounted the translatable table 13 supporting the headstock unit 14 and tailstock structure 15.

Extending rearwardly on the bed are additional ways 16 slidably supporting the wheel head 17 bearing the grinding wheel 18 and its drive member 19. Disposed at the left front of the machine is a rotatable wheel or disc 20 provided with an actuating handle 21, while adjacent thereto is the general starting lever 22, and the reversing lever 23 having the wing portions 24 actuable as by dogs 25 on the table for determination of directional actuation thereof as hereinafter described. The front plate or bracket 26 additionally supports the rate selector valve mechanism 27 having an actuating handle portion 28; the tarry valve adjusting members 29 and 30 and the rate adjuster 31.

The translatable member or table 13 has been shown as provided with a rack 33 driven as by pinion 34, the gearing 35 and shaft 36 of rotary hydraulic motor 37 which for convenience of access is preferably mounted on the rear of the bed 10.

The relationship and operation of the various controls for operation of this motor will be best understood by reference to diagrammatic views 3, 4, 9 and 10 which it is to be understood are to be jointly considered.

Extending from the hydraulic motor 37 is a pair of motor lines 39 and 38 terminating at ports 40 and 41 of the sleeve or bushing portion 42 of the stop or start selector valve. In the running or start position of the parts shown these ports are connected through cannelures 43 and 44 of the spool valve 45 with ports 47 and 48 coupled by conduits 49 and 50 with the variable displacement feed pump 51. This pump is driven as by motor 52 controlled as by switch 53 on the front panel of the machine. Motor 52 also serves to drive the constant displacement pump 54.

It will thus be noted that there has been provided a closed circuit between the variable delivery pump 51 and the hydraulic table actuating motor 37, and suitable mechanism hereinafter described is employed for effecting reversal of fluid flow in this closed circuit within the pump structure by reversal of the position of the pump pintle.

In operation, motor 52, having been suitably started to build up hydraulic pressure in pumps 51 and 54, lever 22 is swung from its stop position indicated in dotted lines in Figure 3 toward the left as viewed in Figures 1 and 3 to its running position indicated in full lines, deenergizing the circuit including mercury switch 55 and electric conduits 56 and 57 and deenergizing the armature 58 of solenoid 59, permitting spring 60 to move start and stop valve 45 from a stop position in which cannelure 43 interconnects ports 47 and 48, short circuiting the V. D. pump 51 to a start position coupling the respective terminals of the pump conduits 49 and 50 with the corresponding motor conduits 39 and 38.

The pump 54 supplies hydraulic pressure medium to a pilot control circuit through conduit system 61 connected in parallel to groove 62 of start and stop valve bushing 42, to branch 63, and to branch 64 extending by way of pressure control valve 65 to conduit 66 coupled with ports 67 and 68 of the table traverse pilot valve structure. A return conduit 69, extending to groove 70 in bushing 42, and also to pressure valve 71, which may have a fifty pound setting, for example, and thence by way of back pressure valve 72, having, for example, a ten pound relief pressure, conducts excess fluid supply to reservoir as at 73, thus determining the pressure developed under these conditions by pump 54.

It will be noted that in the running position of valve plunger 45 grooves 62 and 70 are interconnected by cannelure 74 of plunger 45 so that the pressure medium is conveyed directly from conduit 61 to conduit 69 thus short circuiting valve 65 while when the valve 45 is in its V. D. pump short-circuiting position the flow to conduit 66 and thus to the pilot valve must be by way of valve 65, the advantages of which will be hereinafter pointed out.

The table direction determining members 23—24 are carried by a rock shaft 76 having an arm 77 engaging pilot valve 75 for determining its directional movement.

In Figure 1 the lever 23 is in a clockwise rotated position as viewed in plan, and in accordance therewith the shaft 76 and arm 77 are shown in a clockwise rotated position in Figure 3 whereby the pilot valve 75 is shifted to the right. In this position the pressure conduit 66 is connected to line 86 through which fluid will flow to the cylinder 85 and shift reverse valve plunger 84 to the right. Fluid from the cylinder 82 at the other end of the reverse valve will exhaust through channel 79, cannelures 78 of valve 75, line 88 and low pressure relief valve 72 to reservoir 73.

When trip lever 23 is rotated by dog 25 on the right hand end of the table counterclockwise as viewed in plan, the valve 75 will assume the position shown in Figure 9, resulting in the reverse valve plunger being shifted to the left.

The valve 75 having been shifted to the left as viewed in Figure 9, pressure from conduit 66 will flow by way of cannelure 78 into conduit 79 and at the same time through passage 80 to the cylinder 81 at the end of the valve, causing automatic firing of same. One reaction of introduction of pressure into conduit 79 will be to introduce pressure through port 82' into the right hand cylinder 82 of the reverse valve bushing 83 containing the reversing valve plunger 84, this pressure causing movement of the valve to the left as viewed in Figure 9.

Simultaneously, cylinder 85 at the opposite end of the reverse valve housing will be coupled to reservoir 73 through conduit 86, cannelure 87 of valve member 75, conduit 88, and low pressure relief valve 72, permitting movement of plunger 84 to the left. A branch conduit 69a of conduit 69, the pressure in which is controlled by relief valve 71, is coupled to ports 89 and 90 of bushing 83.

Movement of the table reverse valve plunger 84 to the left serves to couple port 89 with port 91 by way of cannelure 92 so that pressure will flow through conduit 93 to upper chamber 94 of cylinder 95 shown in Figure 10 having slidable therein piston 96 intermediately carried by sleeve 97 which is coupled with pintle 98 of variable delivery pump 51 for controlling the shifting of the pump pintle and thus the rate and direction of flow through pump conduits 49 and 50.

At the same time the lower chamber 94a of cylinder 95 is coupled through conduit 99 and groove 100, Figure 9, of valve bushing 83 with return conduit 101 which extends to blocking valve 102, Figure 10, for controlling the discharge flow through 101 and thus the movement of piston 96 and the associate pump pintle. This blocking valve comprises an outer bushing portion 103 and an inner plunger valve 104 normally urged into raised position by action of spring 105. In this raised position the discharge through conduit 101 will flow by way of groove 106, conduit 101a, throttle 107 and conduit 101b by way of groove 108, conduit 108a and low pressure relief valve 109, Figure 4, to reservoir 73.

Coupled with piston sleeve 97 as by arm 110 is a rod 111 slidable in bushing 112 which has a first port 113 coupled by conduit 69b with the pressure conduit 69a and a second port 114 connected by way of conduit 116 with the chamber 117 at the top of blocking valve casing 103.

Figure 4:
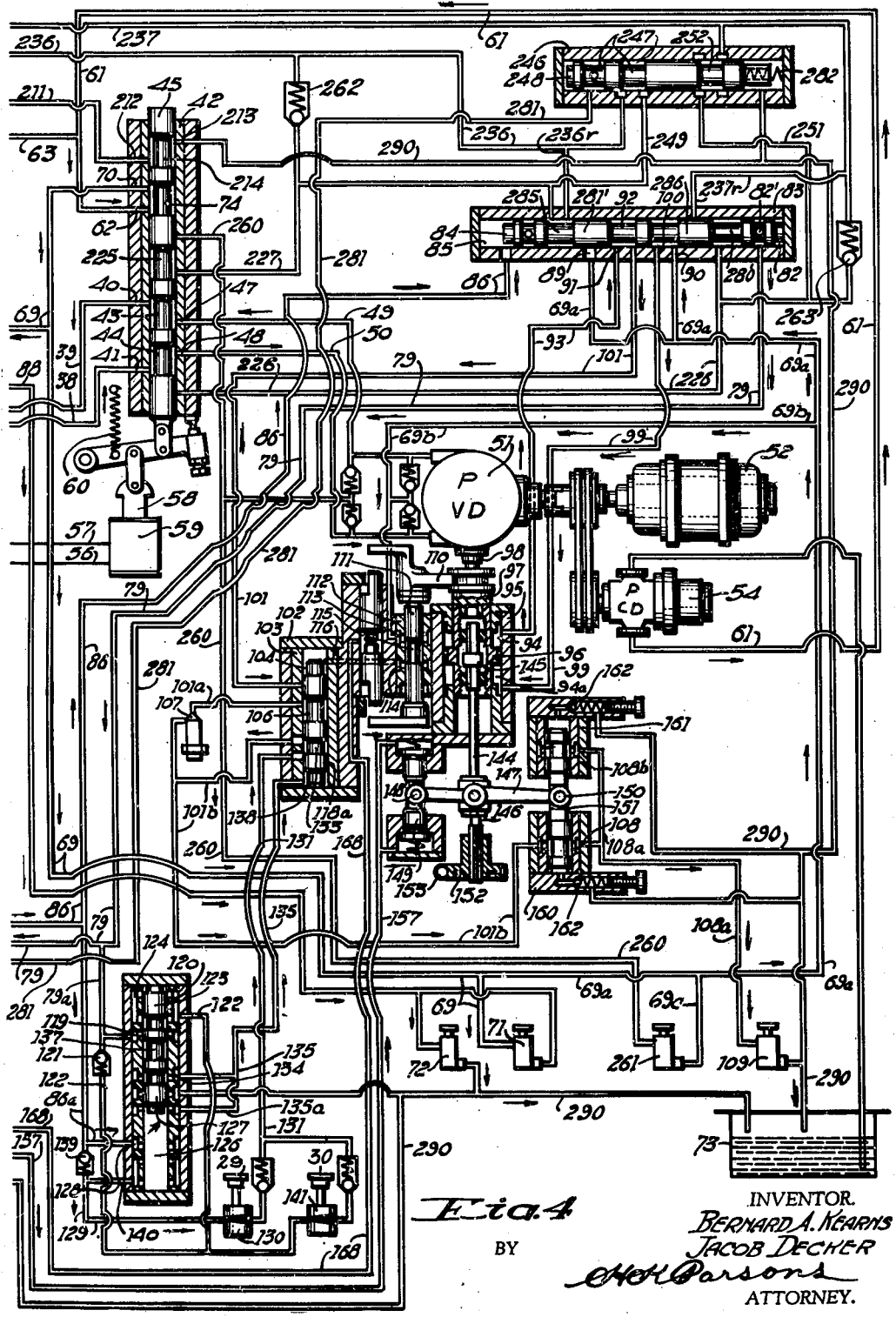
Figure 4 is a continuation of the hydraulic system of Figure 3 illustrating the remaining elements thereof.

When the table reverse valve plunger is shifted to the right as viewed in Figure 4 the connections to the pump pintle piston 96 are reversed, fluid pressure now flowing through channel 99, and channel 93 is connected to exhaust channel 101. This will cause the piston 96 to move upward from the position shown in Figure 10 to the position shown in Figure 4. At the same time rod 111, connected therewith, will also move upward.

In other words, when the trip lever 23 was thrown into the position shown in Figure 1, the pilot valve assumed the position shown in Figure 3 whereby pressure fluid was admitted to line 86. The fluid in this channel flowed simultaneously to cylinder 85, shifting the reverse valve plunger to the right and also through branch line 86a and check valve 139 to port 140 of a tarry valve 120 which will cause upward movement of tarry valve plunger 123 to its midposition shown in Figure 11, and fluid in the upper end will exhaust through port 119, channel 79, groove 78 of pilot valve 75, channel 88, and check valve 72 to reservoir. After the tarry valve plunger passes the midposition it closes port 119 so that the only escape for exhaust fluid is through port 122 which is eventually blocked by spool 118a of blocking valve 103 which is in position to close port 131a.

As the movements thus far described of plungers 84 and 123 stop, fluid pressure is admitted through channel 99 causing upward movement of pump pintle piston 96 to the position shown in Figure 4 and simultaneously causing upward movement of rod 111.

As the rod 111 reaches an intermediate position with movement in either direction the pressure at 69b will react into chamber 117 forcing plunger 104 downward against the action of spring 105, blocking off the flow through conduit 101, thus stopping piston 96, until such time as the valve 104 is again shifted into its raised position. In other words, upon shifting of the reversing valve the reversal of pressure and exhaust connections as respects piston 96 will move piston 96 and with it the valve rod 111 until the pump has been shifted to its intermediate or neutral position at which time valve 104 will move down to block the return conduit 101, locking the piston 96 against further movement for a time determined by the tarry mechanism.

The valve plunger 104 is enabled to move down because the tarry valve plunger 123 has just been positioned to interconnect channel 135 through groove 137 to exhaust channels 290.

Downward movement of plunger 104 also positioned groove 133 to connect port 131a with line 101b whereby fluid in the upper end of the tarry valve may flow out through port 122, tarry throttle valve 141, line 131 and connections just recited to reservoir through check valve 109. When the tarry valve reaches the position shown in Figure 4 pressure from line 140 will pass through chamber 126 and line 135a to the lower end of blocking valve plunger 104, forcing the same upward to the position shown in Figure 10. This will reconnect channels 101 and 101a whereby the pump pintle piston and rod 111 may continue their movement to reverse the flow from pump 51.

When the pilot valve is thrown to the position shown in Figure 9 the tarry valve shifts downward simultaneously with movement of reverse valve plunger to the left. Fluid will now flow through conduit 79 which is provided with a branch 79a terminating in port 119 of the tarry valve bushing 120 and an auxiliary connection through check valve 121 to conduit 122. The tarry valve plunger 123 is slidable within the bushing 120 and can be assumed to be in the position shown in Figure 4. Pressure through 79a, check valve 121, and 122 will react through port 124 to cause initial downward movement of the valve plunger 123, the impounded fluid in the lower portion 126 of the valve bushing being returned through conduit 86a, conduit 86, cannelure 87 of table pilot valve and conduit 88 to reservoir until port 128 is covered, when 123 stops.

As the valve plunger 123 moves downward it will unblock port 119 so that the actuating pressure for movement of valve 123 is then derived directly from conduit 79a. At the same time, however, the lower spool or land 127 will block port 128 to conduit 86a so that the remaining impounded fluid will have to be forced through conduit 129, tarry rate valve 130 and conduit 131. When the blocking valve is in its raised position, Figure 10, spool 118a will block conduit 131 so that no flow is possible until the blocking valve is forced down, thus providing a sequence interlock. When the pump reaches its neutral position, the pressure introduced in line 116 will force the blocking valve downwardly. In this position of the parts conduit 131 will be connected by groove 133 and conduit 101b to reservoir, permitting movement of the tarry valve at a rate determined by the throttle 130.

The setting of tarry valve 130 by its adjusting member 29 will then control the rate of movement of the valve plunger 123 and until its movement has been completed no further shifting of the variable delivery pump control mechanism is possible. When this plunger has been shifted to its limit of movement, port 119 will be connected past the end of the plunger 123 with port 134 and conduit 135 to the bottom chamber 138 of valve 104. The pressure thus introduced plus the spring pressure tending normally to raise the blocking valve being greater than the pilot pressure alone existing in line 116, and chamber 117 will react to raise the blocking valve, reconnecting conduits 101 and 101a to permit continued movement of piston 96 and thus the reversal of the variable delivery pump.

The sequential movements resulting from a selected shifting of the pilot valve 75 will be best understood by reference to the diagrammatic views, Figures 14 to 17 inclusive. In these figures, the pressure conduits leading from the pump 54 are indicated in full lines with arrows indicating direction of flow while conduits extending to reservoir are indicated by the dotted lines, similarly supplied with arrows. Blocked conduits in which there is no flow have been designated by superimposed circles.

When pilot 75 is moved to the right (see Figure 14) pressure flows to left hand end of reverse plunger 84, and its right hand end is connected to exhaust by 79 permitting immediate movement of 84 to the right. At the same time, branch 86a couples pressure from the pump 54 through the pilot to the lower end of tarry plunger 123, raising it rapidly to the intermediate position shown in Figure 14 until port 119 is closed, blocking the escape when continued slow movement only of 123 is possible as the entrapped fluid exhausts through throttle 141 which is adjustable by member 30. The shifting of the reverser 84 couples pressure from the pump 54 through 69a—99 with the chamber at the underside of V. D. pump shifting piston 96 to move the pump to a centralized or neutral position. Fluid from above piston 96 exhausts through 93, the cannelure 92 of the reverser valve plunger 84, line 101, cannelure 106 in blocking valve 104 through 101a, 107, 101b, 108a, 109 and 290 to reservoir. The moving of piston 96 to its intermediate position shown in Figure 15 also moves coupled valve 111 and its groove 115 to couple pump pressure through line 116 to upper end of blocking valve or plunger 104, forcing same downward against spring resistance, the exhaust fluid passing out through conduit 135 and groove 137 in 123 to reservoir. This downward movement, however, of 104, in turn, blocks further exhaust through 101 from the piston 96 so that piston 96 and the associated pump are held in intermediate or neutral position. Pump pressure connected to line 86 continues to act against 123, moving same upward at a rate determined by throttle 141, 131 being connected to 101b at this time, until the valve reaches its uppermost position as shown in Figure 16, when this pressure is also coupled with 135, supplementing action of spring 105 to raise the blocking valve, the contained fluid in the upper end of the chamber being forced in reverse direction through 116—115 as the effect of the pressure in the lower end plus the spring is greater than that of pressure only in the upper end of the chamber. Conduit 101 is then unblocked, reopening exhaust from piston 96.

Piston 96 renews its upward movement, reversing the former effect of the V. D. pump and thus the direction of actuation of motor 37, the parts ultimately assuming the relative positions shown in Figure 17.

It will be seen that there has been provided a unidirectionally effective blocking valve correspondingly reacting on the reservoir discharge line from the V. D. pump piston adjusting mechanism in either direction of shifting of said pump pintle, together with a tarry valve operating oppositely according to the shiftings of the pilot valve and adjustable throttles or tarry controls for determination of the rate of shifting of this valve independently in each direction of movement so that the time element as respects any blocking of the V. D. piston control line may be varied for the respective movements selected.

In the absence of restriction or limitation of the movement of the pump and pintle under influence of hydraulic pressure, the same would be shifted to maximum displacement position. Adjustably to limit the extent of this displacement and therefore to control the rate of traverse of the table as effected by the hydraulic motor 37 suitable means must be provided to control the extent of movement of the pintle. In the form chosen for purposes of illustration this comprises a pair of stop collars 142 and 143 shown in Figure 5. One of these has threaded engagement with the lower portion of the sleeve 97 and the other with the upper portion but with opposite threading so that joint rotation of the members in the same direction will cause their relative approach or retraction. This rotation is effected by rod 144 having an intermediate shouldered portion 145 disposed between the collars and having keyed engagement with the respective collars whereby rotation of the rod will serve jointly to thread the collars toward or from the portion 145 of the rod, thus determining the potential relative movement between sleeve 97 and the rod 144. This rod 144 is rotatably but non-translatably secured to a gimbal bearing 146 pivoted intermediately the length of lever 147 having one end pivoted as at 148 with a double end piston member 149 and the opposite end intermediately pivoted as at 150 with a double end piston member 151. The outer portion of the rod is in keyed sliding engagement with member 152 coupled as by actuating shaft 153 and suitable gearing with the rate adjuster 31 at the front of the machine.

Piston 149 is normally centralized as by springs 154 supplemented by the centralizing plungers 155 and 156 normally inwardly urged by pressure in conduit 157 supplied from conduit 66a by way of cannelure 158 in valve plunger 159. This spring and pressure combination maintains pivot 148 in a stationary position permitting lever 147 to have limited movement thereabout.

At the opposite end of the lever, piston member 151 has its termini sliding in dashpot cylinders 160 and 161 controlled by adjustable relief or throttle valves 162. Low pressure is normally maintained in the cylinders 160 and 161 through passages 163 in the piston termini of member 151 supplied as by the conduit 101b to groove 108 and from groove 108 by way of conduit 108a to groove 108b and passing outwardly through the check valves 164.

Upon shifting of the sleeve 97 under influence of hydraulic pressure from one direction to the other, collar 142 or 143 will strike a shouldered portion 145 of rod 144, when the corresponding check valve 164 will close off the appropriate piston end causing the entrapped fluid to be discharged past the adjustable resistance check valve 162 decelerating the final shifting action before the piston 151 hits and limits or stops the movement of the pump pintle.

When a truing operation is to be performed it is desirable that this be effected at a quite slow traversing rate. To permit employment of a truing rate at any time irrespective of the adjustment of the rate determining collars 142 and 143, use is made of the pair of positively positionable piston plungers 165 and 166 Figure 5 having reduced inner ends fitting into chamber 167 suppliable with fluid under pressure by way of conduit 168 by way of groove 169 in valve member 159. This conduit is normally connected to reservoir as at 170 but when the valve is raised, conduit 168 receives fluid pressure from supply conduit 66a while at the same time the reservoir outlet is closed. This forces both plungers outward until their shoulders engage respective end stops 171 and 172 which positively determine the outer position of the plungers, their ends reacting on abutments 173 and 174 carried by rod 111, thereby transmitting the adjusting movement thus effected through arm 110 to the V. D. pump adjusting pintle.

Alternatively, when it is desired to traverse the movable element such as the table at a rapid rate, handle 28 is held in a depressed position against the resistance of spring 175 effecting a coupling of conduit 157 to reservoir by way of groove 169 and conduit 170, thus releasing the centralizing plungers 155 and 156. With these plungers released the pressure reacting against piston 96 will overcome the resistance of the corresponding centralizing spring 154, swinging lever 147 about the fixed pivot 150 to the limit of movement permitted by the released piston element 149.

This will cause maximum displacement of the V. D. pump pintle control and consequent high speed actuation of motor 37 for movement of the translatable element. It is to be understood that spring 175 reacts on plunger 159 tending to restore same to normal feed position as illustrated when pressure on handle 28 is released. A detent 176 is provided, however, for holding the member in either the feed position or truing position but upon downward movement for rapid traverse it is not intended that the lever shall be detented in that position, whereby the lever will be automatically returned upon its manual release.

It is customary and desirable in grinding machine operations that at each reversal a relative incremental feeding movement take place between the work and grinding wheel. In the present instance this is accomplished by what is known as a pick feed mechanism, including a ratchet 180 Figure 1 on the customary wheelhead feed shaft 181 actuable as by pawl 182 carried by rock arm 183 having a segmental rack portion 184 Figure 3 meshing with rack 185 on piston 186 reciprocable in cylinder 187. A stop member 188 having a wedge face cooperating with wedge 189 adjustable as by member 190 limits the extent of stroke of piston 186 and thus the distance moved by pawl 182 by the amount of rotation imparted to the ratchet for each stroke of the pawl. Actuation of the pick feed mechanism is effected by branch line 79p and 86p extending from the table traverse pilot valve lines to the pick feed valve. When line 86—86p is energized by movement of the pilot valve to the right the pick feed control valve 197 will be in a depressed position and thus couple conduit 86q through groove 191 with conduit 192 which extends by way of groove 193 in pick feed stop valve 194 and conduit 195 to the right hand end of the pick feed cylinder causing a stroke of piston 186 toward the left as viewed in Figure 3.

When the piston 186 is moved to its limit of movement the building up of pressure in channel 86 will cause pressure to flow through check valve 86s conduit 86r to the lower end of valve cylinder 196 moving valve 197 upwardly. At this time the entrapped fluid at the upper end of the valve will be discharged past check valve 198 into conduit 79p which is connected at groove 78 with reservoir or low pressure line 88. This upward movement of the valve will then couple pressure conduit 86p by way of groove 199 with conduit 200 leading to the left hand end of pick feed piston 186 tending to return the piston into position for a new feed stroke. At the same time conduit 192 is coupled by groove 201 with relief conduit 79p permitting reverse shifting of the pick feed piston. With the parts in this position reversal of the table traverse pilot valve will effect a corresponding reversal of pressure condition as respects lines 86p and 79p with the result that unidirectional pick feed actuations and subsequent return strokes of the pick feed piston will be automatically effected at each reversal of the pilot valve and thus of the pressure connections controlled thereby.

To stop automatically the pick feed action or relative infeeding of the parts without stopping the table, as for sparking out purposes, use is preferably made of a shiftable trip such as 202 carried by an adjustable dial member 203 driven by a releasable back gear or clutch device 204 from the pick feed shaft 181. In this manner the trip element 202 is shifted proportional to the pick feed movements and in accordance therewith.

The pick feed stop valve 194 has a terminal portion 205 extending in the path of movement of the trip element 202 for engagement and depression thereby. This depression of valve 194 for movement toward the left, as viewed in Figure 3, moves land 206 in position to block conduit 192 preventing further actuation of the pick feed piston, while coupling conduit 195 to low pressure or exhaust conduit 88. Valve 194 will remain in this position until otherwise positively actuated after withdrawal of member 202 from engagement therewith.

To facilitate resetting of dial 203 the same may be either manually or automatically disengaged from ratchet 180. This is effected by shifter 207 actuable in the first instance by handle 208 and alternatively actuable by piston 209 in cylinder 210 normally coupled by conduit 211 with low pressure or reservoir through ports 212 and 213 in valve bushing 42 and reservoir conduit 290. When valve 45 is actuated to stop position, however, port 212 will then be connected through cannelure 214 with pressure port 70 causing movement of piston 209 to the left and thus actuating shifter 207. The rate at which this is effected for disconnection of this automatic actuation may be determined by setting of needle valve 215.

The pick feed control valve 194 may be manually reset at any time by actuation of knob 216 which may be pushed inwardly to shift valve 217 against action of spring 218. This movement serves to connect pressure line 66p by way of port 219, passage and port 220 of valve 217 and conduit 221 to chamber 222, hydraulically restoring member 194 to its right hand position.

When start and stop valve 45 is again shifted to automatic traverse position conduit 211 will be connected to low pressure or reservoir allowing expansion of spring 218 to move the valve member 217 to the right when 221 will be reconnected to reservoir relieving the hydraulic pressure against the pick feed control valve so that the same is reconditioned for engagement and shifting by the member 202.

Hand traverse control

Figure 7:
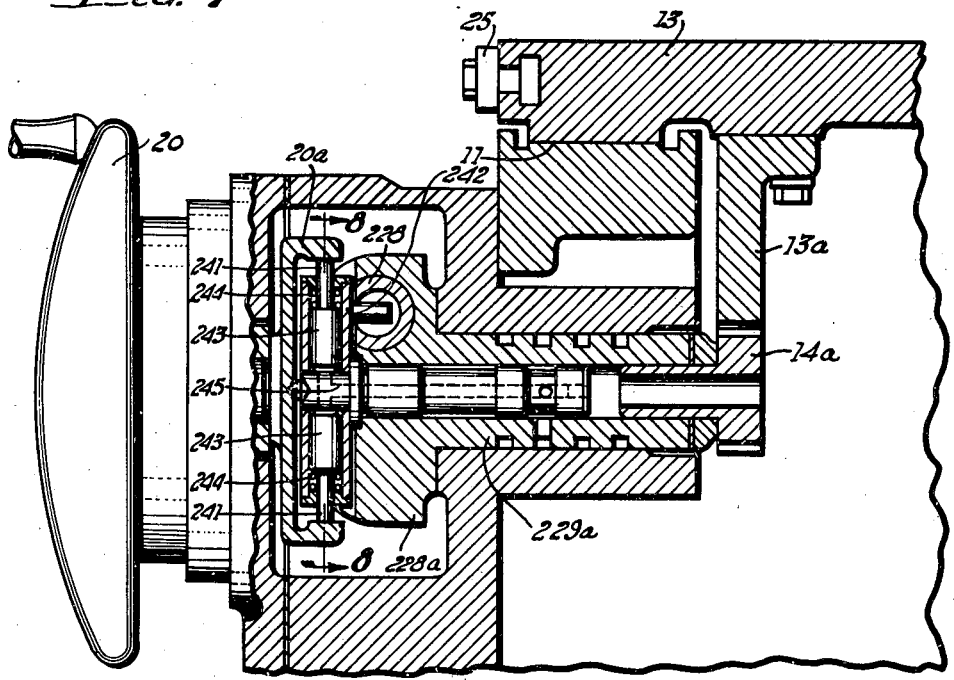
Figure 7 is a section taken on line 7—7 of Figure 1.
Figure 8:
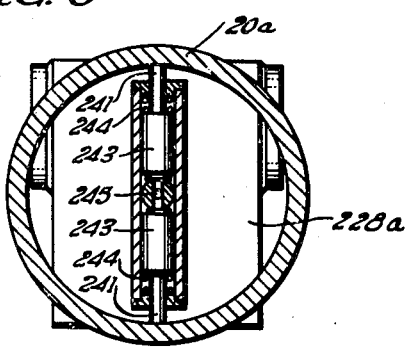
Figure 8 is a section on line 8—8 of Figure 7.

When the solenoid 59 is energized, moving valve 45 downward to stop automatic traverse of the parts as effected by the variable delivery pump 51, the machine is then conditioned for manual traversing. In this position the valve short-circuits the ports 47 and 48 of the variable delivery pump and alternatively couples the lines 38 and 39 of the hydraulic table shifting motor through ports 41 and 40 and cannelures 44 and 43 with the servo-control conduits 226 and 227. The servo-valve structure shown at the left hand portion of Figure 3 and Figures 7 and 8 is that of Patent 2,271,817. It comprises the bushing 228 having slidably mounted therein valve plungers 229. Bushing 228 is provided with a pair of outer ports 230 and 231 receiving pressure from conduit 63 as supplied by pump 54. It is further provided with the reservoir or low pressure centrally disposed return conduit ports 232 and 233 which are coupled to the low pressure or return line 88c and the intermediate ports 234 and 235 coupled respectively with conduits 236 and 237. The valves 229 within the bushing have a pair of grooves or cannelures at 238 and 239 and are longitudinally shiftable to couple alternatively ports 230 and 232 at the one side with port 234 and correspondingly 231 or 233 with port 235 so that one of the intermediate ports will be coupled to pressure while the other is simultaneously coupled to reservoir.

Interdrilling of the valves as at 240 is such that displacement in either direction coupling pressure to the associate cannelure will simultaneously cause the high actuating pressure to pass through this interdrilling and oppositely react between the outer end of the valve and the bushing closure so that the structure is at all times self-centering, tending to restore the valve to intermediate neutral position whenever released or not positively actuated.

The adjustment of plunger 229 is effected by oscillation of hand wheel 20 through the medium of the spokes 241 and shifter arm 242. The spokes 241 are in the form of cylinders containing plungers 243 normally inwardly urged as by springs 244 so that the hand wheel 20 may be freely rotated without actuation of the servo-valve mechanism. When valve plunger 45 is in the stop position, as has been previously mentioned, conduit 211 is coupled with pressure. This pressure reacts through conduit 211a through hub 245 to press the plungers 243 outwardly into clamping engagement with the wheel flange 20a which will then cause rotation of the spokes and shifter arm 242 therewith. Assuming that the valve mechanism is displaced to the left, pressure will be coupled with conduit 236 which extends to the left hand side of the servo-traverse overrun stop bushing 246 through which it is coupled by way of cannelure 247 in valve plunger 248 with conduit 249 terminating in conduit 227 which in the depressed or stop position of valve 45 serves to couple this conduit by way of port 40 with traverse motor conduit 39 for actuation of this motor to the extent determined by the pressure flow through the servo-valve unit 228.

At the same time the opposite motor conduit 38 is connected by cannelure 44 with conduit 226 which extends by way of conduit 251, cannelure 252 of the overrun stop valve and conduit 237 to port 235 of the servo-mechanism and thence to the low pressure or reservoir conduit 88c. It will be understood that on movement of the servo-control mechanism to the right that flow as respects conduits 236 and 237 will be reversed, thus reversing the direction of actuation of hydraulic motor 37. Conduit 236 is provided with a branch 236a extending into chamber 253 at the left hand end of valve unit 65 with the result that when pressure exists in conduit 236 on account of shifting of the servo to the left this pressure will also be introduced against piston 254 having lugs 255 reacting on valve bushing 256 to move the same toward the right, displacing cannelure 257 out of pressure coupling relation to ports 258 and 259. This interrupts the pressure connection by way of this cannelure between conduit system 66—69 and pump pressure conduit 64, so that there is no longer pressure flow from 64 through the valve to 66.

At the same time the pump pressure supply conduit 61 is coupled by cannelure 74 in start and stop valve plunger 45 with conduit 260 extending through a high pressure relief valve 261 which, for example, may be set at a 300 pound value. This renders the pressure available by way of conduit 63 to the hydraulic motor 37 a high pressure as determined by the combined effects of relief valves 261, 71 and 72, as for example a 360 pound value in place of the previously existing 50 pound pressure value. At the same time the general reservoir discharge is from 261 through conduit 69c, valves 71 and 72. Due to this fact a 60 pound pressure is still maintained in line 69 reacting through 66 to the table traverse pilot valve structure.

It is to be understood that when the servo is reversely actuated, the pressure condition created in 237—237a will oppositely shift the piston 254a and valve bushing 256 effecting a corresponding reaction as respects the pressure lines involved in that it again breaks the connection between 64 and 69 at cannelure 257. When the servo is in its intermediate or neutral position, as shown at the left of Figure 3, the reactions in conduits 236 and 237 are equalized as through check valves 262 and 263.

At the same time the back pressure in conduit 88 will react on centralizing pistons 254 and 254a forcing and holding the sleeve 256 in position in which cannelure 257 again interconnects conduits 64 and 66 so that valve 261 is shunted, and a normally relatively low pilot pressure such as the 60 pound pressure previously referred to exists in the several actuating lines.

Means are provided whereby actuation of the table 13 under servo-control will produce a subsequent feed back or follow-up movement of the servo-valve housing 228a to cut off the pressure to the motor 37. This means consists of rack 13a mounted on the underside of table 13 and equal in length to the amount of table movement. In constant mesh therewith is pinion 14a securely fastened to tubular portion 229a of valve housing 228a. Thus, upon stopping rotation of handwheel 20, pressure to motor 37 is interrupted and table movement ceases.

In the diagrammatic view, Figure 13, valve 45 is in the down position. V. D. pump lines 49 and 50 are interconnected and other connections blocked out. VS motor (37) lines 38 and 39 are connected through 45 by 226—237 and 227—236 to central ports at each end of the servo. Pump 54 is connected by 61, 63 to the outer ports of the servo and by 62—74—260 to high pressure relief valve 261.

Movement of the servo-valve plungers 229 to left (as shown in Figure 13) couples 63 via 236—247, 249, 227—225—40, 39 to motor 37 for actuation thereof, the flow being indicated by arrows. The exhaust from the motor flows, as indicated by the arrows through 38, 41, 44, 226, 251, 252, 237, 239, low pressure line 88c—88 and relief valve 72 to reservoir.

When line 63 is connected to 236, pressure acts through 238 to the left end of the cylinder tending to force plunger 229 to the right, closing off 63.

As the table 13 moves to the left, dog 25 will effect counter-clockwise movement of 77 and shift valve 75 and thus reverse valve 84 to the left as shown in Figure 9. Any continued servo-effected movement will shift 274 to right and pressure will flow from 66o through 281 moving blocking valve 248 to right blocking 236—249 and stopping movement to left. 237—251 are also blocked, but auxiliary circuit 226—237R by way of groove 280 in the reversing valve permits servo-controlled reverse movement of the table to the right. When the table dog pressure on 274 is released, spring 271 restores 274, line 281 is coupled to reservoir line through 88 and spring 282 shifts 248 to the left, unblocking both servo-control lines 236—249 and 237—251. During the blocking described, line 227 exhausts to the servo through check valve 262.

Movement of the servo-plungers to the right reverses the direction of flow as respects 236 and 237.

To prevent overrun of the translatable member beyond prescribed limits under influence of the servo-valve, a safety mechanism is embodied in connection with the table traverse pilot valve structure. This comprises a pair of opposed plunger valves 266 and 267 disposed on opposite sides of an extension of the pilot valve actuating rock arm 77.

These valves are movable in the bushings 268 and 269. The springs 270 and 271 normally hold the valves in their inward position and are sufficiently stiff to maintain the adjustable contact members 273 and 274 carried by the valves in position to limit movement of the arm 77 when fired for reversal of the pilot action. However, when the table under servo-control additionally moves in either direction after firing of the arm 77 to cause a second engagement with trip wing 24, an additional movement of arm 77 will be effected. This movement will be sufficient to cause its lower end 272 to displace either 273 or 274 outwardly, depending on the direction of actuation.

The pilot pressure line 66 has portions 66o coupled with ports 275 and 276 of the bushings 268 and 269, normally blanked by the spool portions 277 and 278 of the valve plungers.

Upon displacement outwardly of either of the plungers, groove 279 or 280 will couple this pressure with conduit 281 which extends to the left hand end of valve bushing 246, tending to force valve 248 to the right against pressure of spring 282. This will move cannelures 247 and 252 out of coupling relation at the one side with conduits 236 and 249, and at the other side conduits 237—251, blocking both conduits coupled with motor 37 and thereby positively stopping the table and preventing further reaction of the servo-controlled pressure for movement of the table in the limited direction.

The table movement may be reversed by the servo to back the limiting dog 25 away from the plunger wing 24. When the servo is reversed the former return or low pressure conduit 237 will now become a pressure conduit and as the branch 237r is coupled by way of cannelure 280' of the reverse valve 83 when in its left position with motor connecting conduit 226, pressure can flow through 226 to reverse the action of hydraulic motor 37. This positioning of the reverse valve it is understood would be effected by normal contact of dog 25 with wing 24 prior to the accentuated movement in the same direction causing actuation of the servo-traverse overrun stop valve 248 which blocked conduits 236 and 249.

At this time the spool 281' of the reverse valve plunger blocks branch 236r of line 236 so that this line is blocked respectively in the one branch by the overrun stop valve plunger and in the other branch by the position of the reverse valve plunger so that no flow can occur at either of these points. At this time, however, the position of the servo is such as to couple conduit 236 with low pressure conduit 88c. Consequently, the exhaust from the hydraulic motor 37 can pass from conduit 227 by way of check valve 262 into conduit 236 extraneously of the control valve devices.

This check valve prevents reverse or pressure flow from 236 into line 227, necessitating that any actuating flow be by way of the respective overrun stop and reversing valves.

The safety action upon movement of the parts in the opposite direction is similar in operation in that irrespective of the existing positioning of the reversing valve the limiting dog will first trip actuating member 77 for pilot positioning of the reversing valve and subsequently actuate member 273. In this instance spool 286 will block off branch 237r while cannelure 285 will interconnect branch conduit 236r with 249 so that the pressure may be reversed to motor 37 by the servo effecting a movement of the table in an opposite direction from that in which its movement has been automatically limited while the exhaust from the motor will then flow from 226 through check valve 263 into low pressure conduit 237 extraneous to the overrun stop and reversing valves.

It will be noted that there has thus been provided interdependent control mechanisms for hydraulic actuation of a shiftable or translatable member. These mechanisms include a reversible hydraulic motor, a first power circuit for actuation of said motor including means for effecting automatic reversals of the motor, a second potentially available power circuit, a selector for determining the alternate availability of the respective power circuits, and an independent reversing means normally effective for directional control of the operative reaction of the second power circuit.

Additionally, however, there has been provided in connection with the normal controls for the relative translatory movements effectable by the first power circuit an interrupter means for limiting the operative effect of the second power circuit, and concomitantly effective means conditioning the second power circuit for reverse actuation only as respects a previous direction of operative effectiveness irrespective of the particular directional effectiveness previously existing.

What is claimed is:

1. In a grinding machine, the combination with a bed, of a member translatable on the bed, and means for effecting translation of said member including a hydraulic motor coupled for translation of the member, a first actuating means for the hydraulic motor including a pressure pump, conduits coupling the pump with the hydraulic motor, means for determining the rate and direction of flow of the pressure medium from the pump to the motor, a second source of hydraulic pressure medium, a servo-valve mechanism for determining the rate and direction of flow of the hydraulic medium from said second source, and means for selectively coupling the pump conduits or the servo-control mechanism with the hydraulic motor for control of the actuation thereof and thus the relative translatory movement of the member relative to the bed.

2. The combination with a support element and a member translatable with respect thereto, of means for controlling the translation of the member including a hydraulic motor, a first pressure system including a pump for producing a flow of hydraulic pressure medium, valve means having a first position effective to couple the pump to the motor, means independent of said valve means for determining the rate and direction of activation of the motor by said pump, a second source of hydraulic pressure, said valve means having an alternative position for coupling said second source with the hydraulic motor while disconnecting the pump means therefrom, and means independent of said valve and said first rate and direction determining means intervening said second source and the hydraulic motor independently actuable to determine the rate and direction of actuation of the hydraulic motor.

3. An actuation and control mechanism for a hydraulic motor comprising a source of variable volume of hydraulic medium and a source of constant volume variable pressure hydraulic medium, valve means having a first position effective to couple the variable volume source to the hydraulic motor and a second position effective to couple the variable pressure source to the hydraulic motor, a pressure determinator couplable with the motor supply by said valve means, and additional means coupled with the motor by said valve means when in one position for determining the effectiveness of the coupled pressure determinator.

4. In a power transmission system for driving a load device from either of two power sources, the combination with a driving member, of a plurality of power sources operable thereby, selector means for effecting alternative couplings of said power sources with the load device, and means activated by one of said power sources for determining the rate and direction of reaction of the other power source on the load device when said other power source is coupled by the selector with said load device.

5. In a power transmission system for driving a load device from either of two power sources, the combination with a driving member, of a plurality of power sources operable thereby, selector means for effecting alternative couplings of said power sources with the load device, means activated by one of said power sources for determining the rate and direction of reaction of the other power source on the load device when said other power source is coupled by the selector with said load device, an independent rate and direction control for the second power source, and means in the selector for rendering said independent controller and second power source effective as respects the load device.

6. In a power transmission system for driving a load device from either of two power sources, the combination with a driving member, of a plurality of power sources operable thereby, selector means for effecting alternative couplings of said power sources with the load device, means activated by one of said power sources for determining the rate and direction of reaction of the other power source on the load device when said other power source is coupled by the selector with said load device, an independent rate and direction control for the second power source, means in the selector for rendering said independent controller and second power source effective as respects the load device, reactance means coupleable with said second power source in parallel with the load device, and means controlled by said reactance means for increasing the pressure effect of the second power source when the same is operatively associated with the load device.

7. In a power transmission system for driving a load device, the combination with a reversible power source, of a reversing pilot, a reverse valve hydraulically controlled by the pilot, power means controlled by the valve for effecting opposite directional urges of the reversible power source, a blocking device activated by movement of the reversible power source for stopping the reversal thereof in an intermediate position, an independent tarry device hydraulically associated with the blocking device for determining the delay period in movement of the reversible power member from intermediate to either directionally effective position.

8. In a hydraulic control system of the character described, the combination with a support actuating hydraulic motor, of a reversible variable delivery pump connectible therewith and means for determining the rate and direction of reaction of the variable delivery pump on the support motor including a pilot circuit, a direction determining valve in said plot circuit, a reversing valve actuable by way of the direction determining valve, a power shifter for determining the directional effectiveness of the variable delivery pump actuable by way of the reversing valve, settable means for determining the extent of reaction of the power shifter on the variable delivery pump and thus the rate of actuation of the motor coupled therewith, releasable means for maintaining the settable devices in entirety in predetermined position, and a control device for releasing said means to permit additional adjustment of the variable delivery pump by the power adjuster in a direction as selected by the pilot and reversing valves whereby to effect an increased hydraulic displacement thereby for rapid traverse actuation of the motor.

9. In a hydraulic control system of the character described, the combination with a support actuating hydraulic motor, of a reversible variable delivery pump connectible therewith and means for determining the rate and direction of reaction of the variable delivery pump on the support motor including a pilot circuit, a direction determining valve in said pilot circuit, a reversing valve actuable by way of the direction determining valve, a power shifter for determining the directional effectiveness of the variable delivery pump actuable by way of the reversing valve, settable means for determining the extent of reaction of the power shifter on the variable delivery pump and thus the rate of actuation of the motor coupled therewith, releasable means for maintaining the settable devices in entirety in predetermined position, a control device for releasing said means to permit additional adjustment of the variable delivery pump by the power adjuster in a direction as selected by the pilot and reversing valves whereby to effect an increased hydraulic displacement thereby for rapid traverse actuation of the motor, additional hydraulically actuable means for effecting a definite truing rate adjustment of the variable delivery pump, and valve means actuable by said last-mentioned control device for selectively effecting activation of said truing rate determining means.

10. In a mechanism of the character described, the combination with a support and a member traversable with respect thereto, of a toolhead movable in a direction toward and from the traversable member, means activated by traversing movement of the member for effecting incremental adjustments of the toolhead with respect thereto, means including a hydraulic valve for rendering the incremental adjusting means inoperative as respects the toolhead, means for stopping traversing of the support, and means actuable by said stopping means for resetting the hydraulic valve for reactivation of said incremental adjusting means.

11. In a hydraulic actuating system of the character described, the combination with a variable delivery pump, of means for determining the effectiveness of said pump including a pump adjuster, power actuable means for shifting said adjuster, a blocking device for restricting the movement of the power adjusting means, tarry mechanism for determining the effective period of the blocking device, and means independent of the tarry mechanism for determining the rate of acceleration effectable by the power adjusting means on release of the blocking device.

12. A hydraulic actuation control mechanism of the character described including an adjustable variable delivery actuating pump, a power adjuster for said pump, a settable rate determinator reactable on the power adjuster for limiting the movement thereof, means for reversing the effect of the power adjuster with respect to pump adjustment, the rate determinator being adjustable with and with respect to the power adjuster, tarry mechanism for determining the lag in operative effect of the power adjuster, and additional means for variably determining the rate of movement of the settable pump rate determinator with the power adjuster to determine the acceleration period during shifting of the variable delivery pump.

13. A hydraulic actuation control mechanism of the character described including an adjustable variable delivery actuating pump, a power adjuster for said pump, a settable rate determinator reactable on the power adjuster for limiting the movement thereof, means for reversing the effect of the power adjuster with respect to pump adjustment, the rate determinator being adjustable with and with respect to the power adjuster, tarry mechanism for determining the lag in operative effect of the power adjuster, additional means for variably determining the rate of movement of the settable pump rate determinator with the power adjuster to determine the acceleration period during shifting of the variable delivery pump, means for establishing a centralized position for the settable rate determinator, and means for releasing said centralizing means whereby the power adjuster may effect an increased movement of the pump adjusting means to produce an appreciable increased volumetric discharge of the pump for rapid traverse purposes.

14. In a power transmission system for driving a load device from either of two power sources, the combination with said load device of a first power source volumetrically reactive as respects the load device, a low pressure hydraulic control system for said first power source including an independent source of hydraulic pressure medium, and rate and direction determining means in series therewith, a selector device for effecting alternate couplings of said first or second power sources with the load device, and means for increasing the pressure effect of the second hydraulic circuit when operatively coupled through the rate and direction determinator with the load device.

15. In a power transmission system for driving a load device, the combination with the load device of means providing a pair of alternatively available hydraulic feeding circuits for driving the load device, a pilot system, a reverser controlled by the pilot system, means in the reverser for determining the directional effectiveness of one of the feeding circuits, limiting means for determining the extent of reaction of the second feed circuit on the load device in a given direction including a control pilot and a circuit interrupter for the second circuit, and means in the reverser for the first circuit operative to establish a reverse power connection in the second feed circuit independent of the interrupting means whereby the load device may be activated by the second feed circuit for movement in the opposite direction from that controlled by the limiting means.

16. In a mechanism of the character described, the combination of a translatable member, of means for effecting opposite directional translation thereof, including a source of operating power, a member activatable thereby, control means intervening the source and member including reversible servo-circuits, means activatable by movement of the translatable member for limiting movement thereof in either direction including a power disconnector, and coupled means for establishing a potential reverse power connection independent of the disconnector whereby movement of the translatable member in a direction away from the limiting means may be effected.

17. In a power transmission system for effecting translation of an element from either of two power circuits, the combination with said element of a first power circuit, trip operable means for effecting reversal of actuating effect of said circuit as respects the translatable element to determine the limits of movement thereof, a second power circuit, means for independently determining the directional actuation of the translatable element by said second power circuit, and means operable by the trip operable means for interrupting said second power circuit whereby to limit the movement of the translatable element.

18. In a power transmission system for effecting translation of an element from either of two power circuits, the combination with said element of a first power circuit, trip operable means for effecting reversal of actuating effect of said circuit as respects the translatable element to determine the limits of movement thereof, a second power circuit, means for independently determining the directional actuation of the translatable element by said second power circuit, means operable by the trip operable means for interrupting said second power circuit whereby to limit the movement of the translatable element, and additional means activated by the trip operable means for establishing a potential reverse power connection for the second circuit exclusive of the interrupting means.

19. The combination with a reversible hydraulic motor having a pair of conduits coupled therewith alternatively employable for intake and discharge purposes, of a source of hydraulic medium under pressure, a servo-mechanism for determining the alternate coupling of said source to one or the other of the motor conduits and the coupling of the other conduit to exhaust, a stop valve serially intervening the servo-mechanism and motor having a running position coupling both motor conduits to the servo-mechanism and a stop position interrupting both conduits, a pilot system including limiting means actuable by the motor for effecting pressure reaction to move said stop valve into stop position, means activated by the pilot system for establishing a potential reverse power connection intervening the servo-mechanism and hydraulic motor exclusive of the stop device, and additional means for establishing a reverse return or discharge connection for the motor conduit exclusive of said stop device whereby the motor may be activated for retraction as respects the limiting means.

20. A hydraulic actuation system for a grinding machine or the like, including a hydraulic motor, a variable delivery pump coupleable with the motor for determining the action thereof, and means for controlling the delivery of said pump including a shiftable pump control element, a settable element for limiting the extent of movement of said pump element to determine the rate of feed effectable thereby, a bodily shiftable support for the settable element movable to permit increased adjustment of the pump control element to effect rapid traverse movement of the motor, a truing rate determinator for limiting movement of the pump control element, a hydraulic circuit reactable on the several adjustable elements for determining the respective effective positionings thereof and a control device selectively positionable to control the connection and disconnection of the hydraulic circuit to determine the respective power couplings thereof with said truing rate determinator and bodily shiftable support whereby selective effectuation of feed, rapid traverse or truing actuations of the motor may be determined.

21. A hydraulic actuation system for a grinding machine or the like, including a hydraulic motor, a variable delivery pump coupleable with the motor for determining the actuation thereof, and means for controlling the delivery of said pump including a shiftable pump control element, a settable element for limiting the extent of movement of said pump element to determine the rate of feed effectable thereby, a bodily shiftable support for the settable element movable to permit increased adjustment of the pump control element to effect rapid traverse movement of the motor, a truing rate determinator for limiting movement of the pump control element, a hydraulic circuit reactable on the several adjustable elements for determining the respective effective positionings thereof and a control device selectively positionable to control the connection and disconnection of the hydraulic circuit to determine the respective power couplings thereof with said truing rate determinator, and bodily shiftable support whereby selective effectuation of feed, rapid traverse or truing actuations of the motor may be determined, means for hydraulically effecting shifting of the adjustable pump control element, and means for reversing the hydraulic effect as respects said pump shifting element directionally to vary the feed and rapid traverse reactions of the variable delivery pump with respect to the motor activated thereby.

22. In a hydraulic actuating system of the character described, the combination of a hydraulic motor, of a reversible variable delivery pump operatively coupled therewith, means for determining the reversal of the pump motor combination including a shiftable pump element, a reversible hydraulic control motor coupled therewith, a source of actuating medium, a reversing valve intervening the source and the pump element control motor, said motor having a pair of conduits coupled with the reversing valve and the reversing valve having pressure and discharge ports alternatively coupleable by the valve with the motor conduits, a blocking valve serially interposed in the discharge conduit from said discharge, a pilot circuit including a serially disposed valve having an intermediate position for coupling the pilot circuit to the blocking valve for actuation of the latter to block the discharge conduit and connections between the shiftable pump element and said pilot circuit valve for effecting shifting of the valve to actuate the blocking valve and check pump element movement at a neutral position of the pump.

23. In a hydraulic actuating system of the character described, the combination of a hydraulic motor, of a reversible variable delivery pump operatively coupled therewith, means for determining the reversal of the pump motor combination including a shiftable pump element, a reversible hydraulic control motor coupled therewith, a source of actuating medium, a reversing valve intervening the source and the pump element control motor, said motor having a pair of conduits coupled with the reversing valve and the reversing valve having pressure and discharge ports alternatively coupleable by the valve with the motor conduits, a blocking valve serially interposed in the discharge conduit from said discharge, a pilot circuit including a serially disposed valve having an intermediate position for coupling the pilot circuit to the blocking valve for actuation of the latter to block the discharge conduit and connections between the shiftable pump element and said pilot circuit valve for effecting shifting of the valve to actuate the blocking valve and check pump element movement at a neutral position of the pump, a tarry valve hydraulically coupled with the reversing valve for corresponding opposite directional activations, independent means for determining the rate of opposite directional movements of said tarry valve, and means activated by the tarry valve in opposite directional positions for unidirectionally shifting the blocking valve to release the exhaust conduit and permit resumed movement of the pump adjusting element for effecting reversal thereof.

24. In a hydraulic actuating system of the character described, the combination of a hydraulic motor, of a reversible variable delivery pump operatively coupled therewith, means for determining the reversal of the pump motor combination including a shiftable pump element, a reversible hydraulic control motor coupled therewith, a source of actuating medium, a reversing valve intervening the source and the pump element control motor, said motor having a pair of conduits coupled with the reversing valve and the reversing valve having pressure and discharge ports alternatively coupleable by the valve with the motor conduits, a blocking valve serially interposed in the discharge conduit from said discharge, a pilot circuit including a serially disposed valve having an intermediate position for coupling the pilot circuit to the blocking valve for actuation of the latter to block the discharge conduit and connections between the shiftable pump element and said pilot circuit valve for effecting shifting of the valve to actuate the blocking valve and check pump element movement at a neutral position of the pump, a tarry valve hydraulically coupled with the reversing valve for corresponding opposite directional activations, independent means for determining the rate of opposite directional movements of said tarry valve, means activated by the tarry valve in opposite directional positions for unidirectionally shifting the blocking valve to release the exhaust conduit and permit resumed movement of the pump adjusting element for effecting reversal thereof, and additional means for controlling the rate of movement of the shiftable pump control element and thus the acceleration of the pump and motor.

25. A control for machine tools comprising in combination a movable support, a rotatable driving element for moving said support, a variable speed motor connected to said driving element, a motor control member movable for determining the direction of movement of said support by said element, a second motor control member for regulating the speed of movement of said support by said element at set rates, a third motor control member normally maintained in a neutral position for determining both the speed and direction of movement of said support by said driving element independently of any setting of the said second-named control member, and means for alternatively connecting either the last-mentioned or the other control members with the motor for determination of the rate and direction of actuation thereof.

26. A control for machine tools comprising in combination a movable support, a rotatable driving element for moving said support, a variable speed motor connected to said driving element, a motor control member movable from a stop position for determining the movement of said support by said element, a second motor control member for regulating the speed of movement of said support by said element at set rates, and a third motor control member, normally maintained in a neutral position, for determining both the speed and direction of movement of said support by said driving element, independently of any setting of said second-named control member, and only when said first-named control member occupies its stop position.

27. A control for machine tools comprising in combination a movable support, a rotatable driving element for moving said support, a variable speed motor connected to said driving element, a motor control member movable from a stop position for determining movement of said support by said element, a second motor control member for regulating the speed of movement of said support by said element at set rates, and a third motor control member normally maintained in a neutral position, from which said member is movable to independently determine the speed and direction of movement of said support by said driving element, whenever said first-named control member occupies its stop position.

28. A control for machine tools comprising in combination a movable support, a rotatable driving element for moving said support, a variable speed motor connected to said driving element, a motor control member movable from a stop position for determining movement of said support by said element, a second motor control member for regulating the speed of movement of said support by said element at set rates, a third motor control member normally maintained in a neutral position, from which said member is movable to independently determine the speed and direction of said support by movement of said driving element, and means for preventing control of said motor by said third member when said first-named control member occupies any position other than its stop position.

29. A control for machine tools comprising in combination a movable support, a rotatable driving element for moving said support, a variable speed motor connected to said driving element, a motor control member movable from a stop position for determining the movement of said support by said element, a second motor control member for regulating the speed of movement of said support by said element at set rates, and a third motor control member normally maintained in a neutral position, with displacement of said control member from its neutral position serving to cause the movement of said support by said driving element at a rate of speed independent of the setting of said second-named motor control member, and only when said first-named control member occupies its stop position.

30. A control for machine tools comprising in combination a movable support, a rotatable driving element for moving said support, a variable speed motor connected to said driving element, a motor control member movable from a stop position for determining the movement of said support by said element, a second motor control member for regulating the speed of movement of said support by said element at set rates, and a third motor control member normally maintained in a neutral position, with displacement of said control member from its neutral position serving to cause the movement of said support by said driving element at a rate of speed independent of the setting of said second-named motor control member, whenever said first-named control member occupies its stop position, and with said third-named control member always returning to its neutral position upon release thereof.

31. A control for machine tools comprising in combination a tool support, a work support, a rotatable driving element for moving one of said supports relative to the other, a variable speed prime mover connected to said driving element, a control member for said prime mover movable from a stop position, for determining the movement of one of said supports by said driving element, a second control member for regulating the speed of movement of said support by said driving element at set rates, and a third control member for said prime mover, turnable from a neutral position, to regulate both the speed and direction of movement of said support by said driving element in accordance with the degree and direction of such turning by said third-named control member, independently of any prior setting of said second-named control member, and only when said first-named control member occupies its stop position.

32. A control for machine tools comprising in combination a tool support, a work support, a rotatable driving element for moving one of said supports relative to the other, a variable speed prime mover connected to said driving element, a control member for said prime mover movable from a stop position, for determining movement of one of said supports by said driving element, a second control member for regulating the speed of movement of said support by said driving element at set rates, and a third control member for said prime mover, turnable from a neutral position, to regulate both the speed and direction of movement of said support by said driving element in accordance with the degree and direction of such turning by said third-named control member, independently of any prior setting of said second-named control member, and for preventing movement of said support by accidental turning of said third control member, while said support is moving under control of said first-named member.

BERNARD A. KEARNS.
JACOB DECKER.

REFERENCES CITED

The following references are of record in the file of this patent:

UNITED STATES PATENTS

| Number | Name | Date |
| --- | --- | --- |
| 1,854,127 | Ferris | Apr. 12, 1932 |
| 1,884,277 | Sassen | Oct. 25, 1932 |
| 1,902,063 | Ferris et al. | Mar. 21, 1933 |
| 1,932,760 | West | Oct. 31, 1933 |
| 1,976,122 | Haas | Oct. 9, 1934 |
| 1,978,346 | Ernst et al. | Oct. 23, 1934 |
| 1,994,989 | Ferris et al. | Mar. 19, 1935 |
| 2,000,553 | Alden | May 7, 1935 |
| 2,005,018 | West et al. | June 18, 1935 |
| 2,019,486 | Ernst et al. | Nov. 5, 1935 |
| 2,078,749 | Wood | Apr. 27, 1937 |
| 2,094,526 | Carlson | Sept. 28, 1937 |
| 2,099,776 | Svenson | Nov. 23, 1937 |
| 2,166,423 | Clark | July 18, 1939 |
| 2,214,389 | Wahlmark | Sept. 10, 1940 |
| 2,234,009 | Robinson | Mar. 4, 1941 |
| 2,274,191 | Davis | Feb. 24, 1942 |